(No Model.)

L. D. MONROE & G. W. WIGGINS.
COMBINED COTTON SEED PLANTER AND FERTILIZER DISTRIBUTER.

No. 330,342. Patented Nov. 10, 1885.

WITNESSES:
W. W. Hollingsworth
John C. Kenon

INVENTOR:
L. D. Monroe
G. W. Wiggins
BY Munn & Co.
ATTORNEYS.

N. PETERS, Photo-Lithographer, Washington, D. C.

UNITED STATES PATENT OFFICE.

LORENZO D. MONROE AND GEORGE W. WIGGINS, OF MORGAN, GEORGIA.

COMBINED COTTON-SEED PLANTER AND FERTILIZER-DISTRIBUTER.

SPECIFICATION forming part of Letters Patent No. 330,342, dated November 10, 1885.

Application filed April 30, 1885. Serial No. 164,055. (No model.)

*To all whom it may concern:*

Be it known that we, LORENZO DOW MONROE and GEORGE WASHINGTON WIGGINS, citizens of the United States and residents of Morgan, in the county of Calhoun and State of Georgia, have invented certain new and useful Improvements in a Combined Cotton-Seed Planter and Fertilizer-Distributer; and we do hereby declare that the following is a full, clear, and exact description thereof, reference being had to the accompanying drawings and letters of reference marked thereon, in which—

Figure 1:
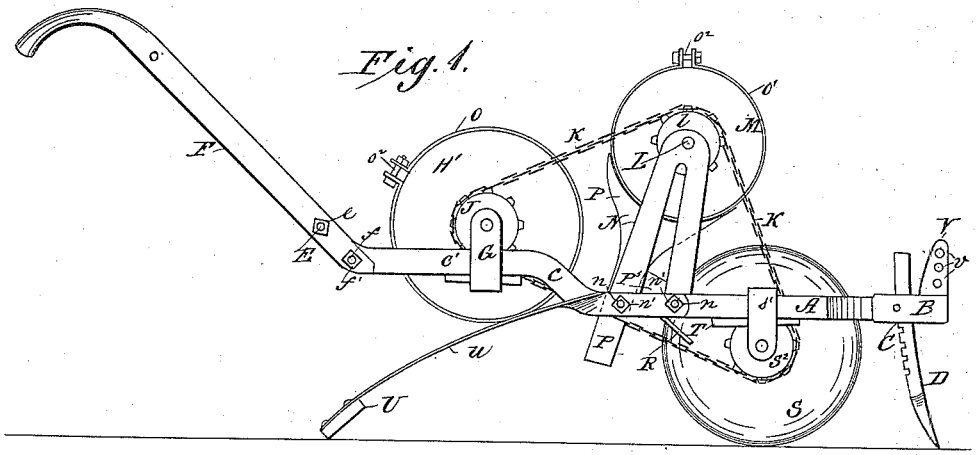
Figure 2:
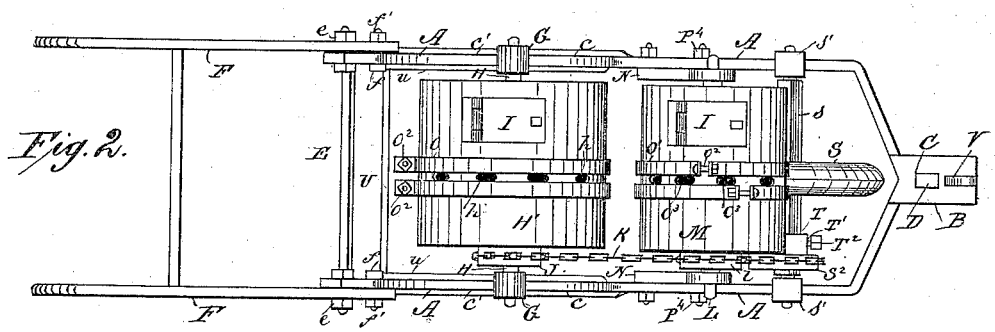
Figure 3:
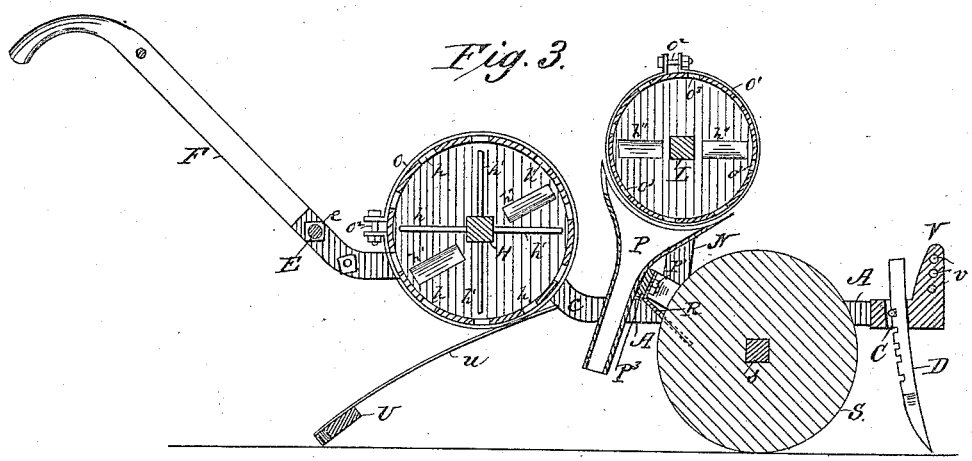
Figure 4:
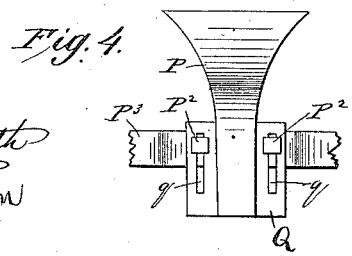

Figure 1 is a side elevation. Fig. 2 is a plan view. Fig. 3 is a central longitudinal sectional elevation, and Fig. 4 a detached front view of the seed-tube.

Our invention relates to that class of cotton-seed planters and manure-distributers which are combined in one machine; and to this end the invention consists in the novel construction and arrangement of parts, as will be hereinafter more particularly described and specifically claimed.

In the annexed drawings, A represents a metallic frame of rectangular construction, or nearly so, its forward or front end being tapered off in the form of the letter V and terminating in a point or projection, B, said projection having a slot, C, therein, through which a tooth or furrow-opener, D, is passed, said furrow-opener having a series of notches on one of its sides to engage a pin running transversely through the slot C, so as to admit of the vertical adjustment of the furrow-opener or tooth D for digging deeper or shallower in making the furrow for the planting of the seed. About midway of the metallic frame A, and to insure a higher plane of the frame from that point, a bend, c, is made, which gives said frame an inclination rearward of sufficient height to make another bend, c', for the location of a rear drum or cylinder, and from which point the frame runs nearly straight to its rear ends, where they terminate in upward curves. The rear end of this frame A is formed by a metallic rod, E, having screw-threads on each end of said rod, which pass through holes in the upwardly-projecting ends of the frame and secured thereto by means of nuts e, having screw-threads corresponding to those on the rod E.

F F are two handles, attached to the rear curved portion of the frame A by means of short screw-threaded bolts $f$ and nuts $f'$, and also by means of the rod E and nuts above referred to.

G G are adjustable boxes, within which are journaled the shaft H of a revolving manure-drum, H', which is provided with a series of apertures, $h$, and a door, I, the latter being for the admission of manure. The shaft H of the drum H' is provided with beaters or stirrers $h'$, which pass through the center thereof and cross at right angles to each other for pulverizing the fertilizer and keeping it in a condition to pass through the apertures of the drums by forcing it at all times to the center of the drums. The drums have also flanges $h^2$, secured upon the inside of the ends thereof, which assist the beaters in forcing the fertilizer through the apertures of the drums.

J is a sprocket-wheel secured upon the shaft H, which passes through the drum H' at one end, and over this sprocket-wheel passes a sprocket-chain, K, which connects and communicates motion to another drum or cylinder, M, for containing the seed, and another sprocket-wheel upon one end of a driving or colter-wheel shaft, which will be hereinafter more fully described. The said drum or cylinder M is similar in its construction to the drum H', differing only in size, it being smaller.

The shaft L, upon which the seed-drum is mounted, is provided at one end with a sprocket-wheel, $l$, and is journaled in the top of upright hangers N upon opposite sides of the frame A, and which are longer than the journal-boxes G G of the manure drum or cylinder, the lower portion or ends of these hangers are secured about midway upon the inside of the metallic frame A by means of screw-bolts $n$ and nuts $n'$. The manure-drum H' and the seed-drum M, respectively, are provided with bands O O', running circumferentially around the drums, their meeting ends being connected together by screws $O^2$, the object of said bands being to register with the series of apertures $h$ in the manure-drum and a series of apertures, $o^3$, in the seed-drum, whereby the quantity of manure and seed discharged from the drums is regulated. The drum M, in consequence of being journaled in the long upright hanger N, is raised considerably higher than the drum H'.

P is a seed-tube secured in any suitable manner, but in the present instance by means of nuts P' and square-headed bolts P² to a double crank-bar, P³, which has its ends screw-threaded and secured by means of nuts P⁴, holes being made in the metallic frame A, near the center thereof, for the ends of the bar to pass through. It will be observed that this seed-tube P is of peculiar construction, the upper portion being of concave form, and the lower portion, upon its front side, being provided with a plate, Q, having slots $q$ thereon, through which the screw-headed bolts P² pass, so that the tube can be adjusted to fit up snugly against the drum or cylinder M, when desired, which prevents all escape of the seed from over the top or edge thereof.

By our machine not only cotton-seed, but seeds of other kinds can be sown in drills or dropped at suitable distances apart in planting.

R is a scraper bifurcated or notched in such a manner as to correspond with the beveled periphery of a driving-wheel, which runs in the furrow for the seed preparatory to its dropping from the drum or cylinder M. The scraper R continually scrapes off any dirt or soil that may adhere to the driving-wheel, the wheel therefore being free from clogging in its revolution.

S is the driving-wheel, mounted upon a driving-shaft, $s$, journaled in adjustable boxes $s'$, which are slid or adjusted longitudinally over the frame A. These boxes $s'$ are held in position by means of keys or wedges T, and can be replaced in any desired position upon the frame A, or adjusted to and from the seed-drum. Upon one end of the driving-shaft $s$ is secured an adjustable sprocket-wheel, $s^2$, provided with a flange, T, having thereon a hole, T', for the reception of an adjustable screw, T², by which means the wheel $s^2$ is adjusted nearer to or farther from the driving-wheel, as occasion requires.

U is a cover attached to the ends of two springs, $u$, the forward ends of these springs being secured upon the outside and center of the metallic frame A by means of the same bolts and nuts which secure the upright hangers thereto at their depending ends, and also by means of the screw-threaded ends of the double crank-bar, which pass through the metallic frame A, and the nuts or the ends of the said bar.

V is a clevis, made integral with the point of the metallic frame A, and provided with a series of apertures, $v$, for adjusting vertically the draft-bar, to which are hitched the horses for drawing the machine.

It will be obvious from the foregoing description that the furrowing, planting, fertilizing, and covering of the seed can be thoroughly and expeditiously performed at one operation, and requiring but little expenditure of labor or trouble on the part of the attendant.

Having thus described our invention, what we claim as new, and desire to secure by Letters Patent, is—

1. In a cotton-seed planter and fertilizer-distributer, the combination of the revolving drums H' and M, the latter being mounted upon the upright hangers N, the adjustable seed-tube, constructed as described, the driving or colter wheel S, adjustable furrow-opener D, and coverer U, all being arranged and operating substantially as herein set forth.

2. In a cotton-seed planter and fertilizer-distributer, the combination of the revolving drums or cylinders H' and M, seed-tube P, provided with the adjustable slotted plate Q, the adjustable bands encircling the drums H' and M, hangers N, and metallic frame A, all constructed and operating as herein described, and for the purpose set forth.

3. In a cotton-seed planter and fertilizer-distributer, the combination of the drums H' and M, the shafts thereof being provided at one end with sprocket or cog wheels, vertically-adjustable seed-tube P, driving-wheel S, mounted upon the driving-shaft, said shaft being provided at its end with an adjustable flanged sprocket-wheel, and sprocket-chain connecting the drums and colter or driving wheel S, whereby motion is communicated to the drums by said driving-wheel, substantially as described, and for the purpose set forth.

4. In a cotton-seed planter and fertilizer-distributer, the combination of the revolving drums H' and M, seed-tube P, driving or colter wheel S, adjustable boxes G G, hangers N, double crank-bar P³, scraper R, and adjustable bar connecting the rear of the metallic frame A, and metallic frame A, constructed as described, and coverer U, all operating as herein specified.

LORENZO D. MONROE.
GEORGE W. WIGGINS.

Witnesses:
L. G. CARTLEDGE,
JOHN J. RAGAN.